United States Patent

Tonelli et al.

[11] Patent Number: 5,959,058
[45] Date of Patent: *Sep. 28, 1999

[54] COATINGS BASED ON FLUOROPOLYETHERS

[75] Inventors: Claudio Tonelli, Concorezzo; Massimo Scicchitano; Stefano Turri, both of Milan, all of Italy

[73] Assignee: Ausimont S.p.A., Milan, Italy

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/613,518

[22] Filed: Mar. 11, 1996

[30] Foreign Application Priority Data

Mar. 10, 1995 [IT] Italy .................................. MI95A0474

[51] Int. Cl.⁶ .......................... C08G 18/50; C08G 65/00; C07C 43/12
[52] U.S. Cl. ................. 528/70; 106/287.26; 106/287.28; 549/551; 558/449; 560/100; 560/127; 560/166; 560/262; 560/264; 564/505; 568/615
[58] Field of Search ......................... 106/287.26, 287.28; 568/615; 528/70; 560/100, 127, 166, 262, 264; 549/551; 558/449; 564/505

[56] References Cited

U.S. PATENT DOCUMENTS

| | | |
|---|---|---|
| 2,242,218 | 5/1941 | Auer . |
| 3,665,041 | 5/1972 | Sianesi et al. . |
| 3,715,378 | 2/1973 | Sianesi et al. . |
| 3,810,874 | 5/1974 | Mitsch et al. . |
| 4,782,130 | 11/1988 | Re et al. .................. 528/70 |
| 4,863,986 | 9/1989 | Re et al. .................. 528/70 |

FOREIGN PATENT DOCUMENTS

| | | |
|---|---|---|
| 0098699 | 6/1983 | European Pat. Off. . |
| 0148482A2 | 7/1985 | European Pat. Off. . |
| 0239123A2 | 9/1987 | European Pat. Off. . |
| 0294829 | 6/1988 | European Pat. Off. . |
| 0622391 | 4/1994 | European Pat. Off. . |
| 0622353A3 | 11/1994 | European Pat. Off. . |
| 0622391A2 | 11/1994 | European Pat. Off. . |
| 0665253 | 1/1995 | European Pat. Off. . |
| 0665253A1 | 8/1995 | European Pat. Off. . |
| 0212319 | 7/1996 | European Pat. Off. . |

OTHER PUBLICATIONS

"Synthesis and characterization of low–viscosity fluoropolyether–basedsegmented oligomers," Massimo Scicchitano et al. in Applied Macromolecular Chemistry and Physics 231 (1995) Sep., Zug, CH.

Dahm et al., "PU Paints and Coatings", Polyurethane handbook, G. Oertel(ed.), Hanser Publishers, NY, pp. 555–556 (1993).

*Primary Examiner*—Donald R. Wilson
*Attorney, Agent, or Firm*—Nikaido, Marmelstein, Murray & Oram, LLP

[57] ABSTRACT

Use of fluorinated polymers based on fluoropolyethers for the preparation of crosslinkable high dry formulations comprising a fluorinated part $R_F$ and optionally an hydrogenated part $R_H$, not containing groups capable of linking by means of hydrogen bonds to basic acceptors, an hydrogenated part $Rh_1$ and $Rh_2$, wherein $Rh_1$ is equal to or different from $Rh_2$, and $Rh_1$ and/or $Rh_2$ being linking bonds containing at least a functional group capable of linking by means of hydrogen bonds with basic acceptors, the bonds joining the fluorinated part to the hydrogenated part being of ether C—O simple type, the terminals $T''_a$ and $T''$ being such as to render the structure mono-, bi- or polyfunctional, and subsequent crosslinking of the fluorinated polymer, the monofunctional products being always in admixture with a resin having even a higher functionality than the described type; the preferred fluorinated products have the formula:

$$T''-(Rh_2)_y(R_H)_x-R_F-(R_H)_x-(Rh_1)_yT'_a$$

7 Claims, No Drawings

COATINGS BASED ON FLUOROPOLYETHERS

The present invention relates to high dry formulations for preparing coatings.

In particular it relates to high dry compositions based on fluoropolymers; as high dry, formulations are meant, wherein the solvent is 30% by weight at most, preferably 10% at most by weight. More particularly the object of the present invention relates to compositions suited for top coating, in particular in the car field, endowed with optimal capacity of adhesion to pigmented bases, high hardness, protective and antispot properties, scratch resistance, weather-proof and in particular resistant to UV radiations. Such compositions are usable also in field applications, that is outside, assuring high aesthetic qualities, such as high gloss, image definition (DOI), together with the protective function and utilize a little solvent thus reducing the environmental impact.

The use of fluorinated polymers for preparing coatings is known. These polymers are endowed with very good chemical, thermal resistance, oleo- and water repellence and UV resistance. Known formulations for coating, having a fluorinated basis, are for instance chlorotrifluoroethylene (CTFE) copolymers with hydrogenated vinylether or vinylesters; or VDF (vinylidenefluoride) polymers or vinylidenefluoride copolymers with tetrafluoroethylene and/or hexafluoropropene. The former are for instance LUMIFLON$^{(R)}$ and CEFRAL$^{(R)}$, the latter are commercialized for instance as KYNAR$^{(R)}$ and TECNOFLON$^{(R)}$.

The main drawback is that they have to be applied at high dilutions, even of 90% by weight of solvent, leading to high costs for eliminating the solvents.

It is known in the art also the use of partially fluorinated copolymers, for instance perfluoropolyethers of elastomeric or filming type crosslinkable depending on the molecular weight and on the ratio between fluorinated part and hydrogenated part.

However also these products need to be used at high dilutions to be applied with industrial methodologies. Moreover the stability outside is not optimal.

Also for these products, therefore, it is not possible to prepare high dry formulations.

Coatings based on polyesters from perfluoropolyethers and coatings always based on perfluoropolyethers containing acrylic groups are also known. See European patent applications EP 0622353 and 0622391 in the name of the Applicant. These products give good coatings and allow to use less solvent than the products indicated above, however it is not possible to obtain high dry formulations since they require an amount of solvent not lower than 50% by weight.

It is also known the use of fluorinated water coatings. These formulations contain a low amount of solvent, of about 10%, whereby they could fall within high dry formulations. However they are endowed with low chemical resistance and moreover do not show the high aesthetic and mechanical properties, such as the gloss and the hardness that the high quality coatings must have.

Coatings belonging to the solvent-less category are known, that is, homogeneous bicomponent compositions without solvents or having a limited amount of solvents, applicable by means of traditional techniques and therefore endowed with minimum environmental impact. Epoxy resins can be mentioned. These resins however lead to poor coatings from the aesthetic point of view, for instance the gloss, which is of the order of 10–20 at 60° C. according to ISO 2813 standard. These compositions, however, are such as not to allow to obtain reduced thicknesses, lower than 50μ, as requested in the top coating. Moreover the filming of these products is not very good.

High dry compositions are also known from a former not yet published patent application of the Applicant, European patent appln. No. 95101145.1, wherein the formulation at the application contains an amount of solvent of 20% by weight, which use crosslinked fluoropolyethers comprising a fluorinated part $R_F$ and optionally an hydrogenated part $R_H$, the bonds joining the fluorinated part to the hydrogenated part being of ether C—O simple type, the terminals T' being such as to render the structure bi- or polyfunctional, thus making possible the crosslinking reaction, the hydrogenated part $R_H$ not containing groups capable of linking each other by means of hydrogen bonds to basic acceptors. In particular the preferred fluorinated polymers described have the formula

  (I)

wherein

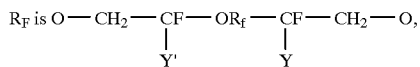

wherein $R_f$ is a fluoropolyether chain, Y and Y' being equal to or different from each other and being F or $CF_3$ x is an integer from 0 to 10, preferably from 1 to 3;

$R_H$ is a linking bivalent radical of linear aliphatic type —$(CH_2)_m$—, wherein m is an integer from 1 to 20, or of (alkylene)cycloaliphatic, (alkylene)aromatic type, optionally having also heteroatoms on the ring or in chain, the number of carbon atoms of the cycloaliphatic compounds being from 3 to 20, for the aromatic ones from 5 to 30; the $R_H$ group can also be a mixture of the types indicated:

T'=—$(CH_2CH_2O)_n$—$(R_H)_{x'}$—T, wherein n is an integer from 0 to 6, preferably from 1 to 2;

x' is an integer from 0 to 10, preferably from 1 to 3, x' can be different from x; and T being hydrogen or a terminal capable of rendering bi- or polyfunctional the structure such as to make it reactive towards the crosslinking agents of both ionic and radical type.

In particular the preferred terminals T are of the type:

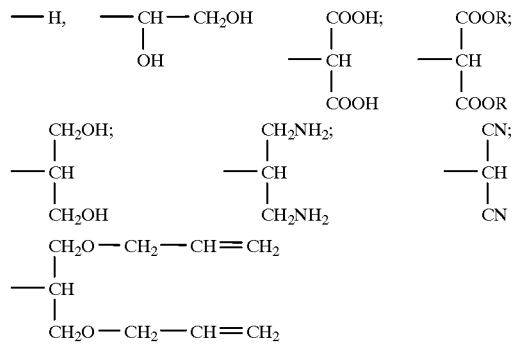

In said Italian (European) application were mentioned as groups which had to be absent from the hydrogenated part $R_H$, for instance, —COOH; —NH—COO—; —NH—CO—NH—; —OH; —$NH_2$; —NH—; —CO—NH—.

The radical $R_f$ of molecular weight comprised, preferably from 500 to 5000, more preferably from 700 to 1500, represents a fluoropolyether chain bifunctional radical, comprising as repetitive units sequences of one or more oxyfluoroalkylene units of the type

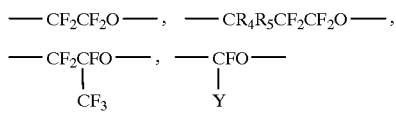

wherein $R_4$ and $R_5$ have the meaning indicated hereafter.

Said fluoropolymers by addition of small amounts of solvent, of 20% at most, lead to the formation of solutions having an extremely low viscosity, generally of the order of 50–300 cpoise at room temperature.

The preferred compounds of the formula I were the following:

$$R_F(H)_2, \quad R_F(CHCH_2OH)_2, \quad R_F(CH_2CHCH_2OH)_2,$$
$$\quad\quad\quad\quad\quad\quad | \quad\quad\quad\quad\quad\quad\quad\quad |$$
$$\quad\quad\quad\quad\quad\quad H \quad\quad\quad\quad\quad\quad\quad\quad OH$$

$$R_F\left[(CH_2)_6-\underset{|}{\overset{CH_2OH}{CH}}-CH_2OH\right]_2 \quad R_F\left[(CH_2)_6-\underset{|}{\overset{CN}{CH}}-CN\right]_2$$

$$R_F[(CH_2)_6-CH(CH_2-O-CH_2-CH=CH_2)_2]_2$$

The coatings obtainable from the fluoropolymers based on perfluoropolyethers of the former European patent application of the applicant give films with good properties, however compatibility with crosslinking agents and pigments is limited and moreover adhesion and elasticity, gloss and folding-resistance are not very high.

The Applicant has unexpectedly found that it is possible to improve high solid compositions based on said fluoropolymers based on perfluoropolyether of the European application of the Applicant described above, in particular to remarkably increase compatibility with crosslinking agents and pigments and contemporaneously to obtain transparent films with high gloss and having superior adhesion, improved hardness and folding resistance.

Object of the present invention is therefore the use of fluoropolymers based on fluoropolyethers for preparing crosslinkable high dry formulations comprising a fluorinated part $R_F$ and optionally an hydrogenated part $R_H$, not containing groups capable of linking by means of hydrogen bonds to basic acceptors, an hydrogenated part $Rh_1$ and $Rh_2$, wherein $Rh_1$ is equal to or different from $Rh_2$, and $Rh_1$ and/or $Rh_2$ being linking bonds containing at least a functional group capable of linking by means of hydrogen bonds with basic acceptors, the bonds joining the fluorinated part to the hydrogenated part being of ether C—O simple type, the terminals $T_a$ and $T''$ being such as to render the structure mono-, bi- or polyfunctional, and subsequent crosslinking of the fluorinated polymer, the monofunctional products being always in admixture with a resin having a higher functionality even than the described type. The preferred fluorinated products, pure or in admixture, have the formula:

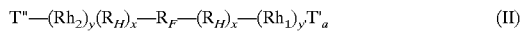

wherein

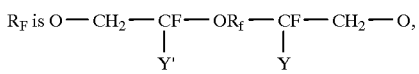

wherein $R_f$ is a fluoropolyether chain; wherein Y and Y' are equal to or different from each other and being F or $CF_3$;

x is an integer from 0 to 10, preferably from 1 to 3;

$R_H$ is a linking bivalent radical of linear aliphatic type $-(CH_2)_m-$, wherein m is an integer from 1 to 20, $-(O-CH_2CH_2)_{m'}-$, wherein m' is an integer from 0 to 6, or of (alkylene)-cycloaliphatic, (alkylene)aromatic type, optionally having also heteroatoms on the ring or in chain, the number of carbon atoms of the cycloaliphatic compounds being from 3 to 20, for the aromatic ones from 5 to 30; the $R_H$ group can also be a mixture of the types indicated;

$Rh_1$ and $Rh_2$, equal to or different from each other, are linking bridges as $R_H$ but containing at least a functional group capable of linking by means of hydrogen bonds with basic acceptors;

y and y' equal to or different from each other, are integers from 0 to 1, at least one of the two being different from 0.

$T'_a = -(CH_2CH_2O)_n-(R_H)_{x'}-T_a$ wherein n is an integer from 0 to 6, preferably from 1 to 2;

$T'' = -(CH_2CH_2O)_n-(R_H)_{x'}-T_b$ x' is an integer from 0 to 10, preferably from 1 to 3, x' can be different from x; and $T_a$ and $T_b$ being hydrogen or a reactive terminal, capable of rendering mono- or polyfunctional the structure such as to make the resin reactive towards the crosslinking agents of both ionic and radical type, and $T_a$ being equal or different from $T_b$ such as the $T_a$ and $T_b$ end groups not being contemporaneously H.

In particular the preferred terminals $T_a$ and $T_b$ are of the type:

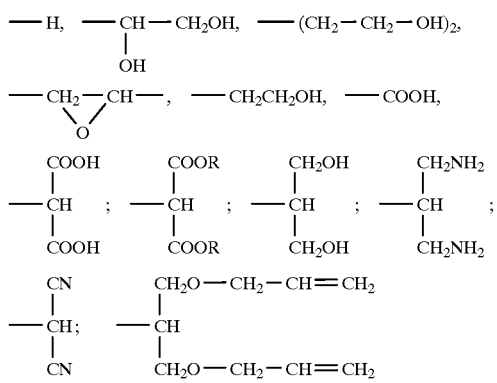

The preferred $Rh_1$ and $Rh_2$ groups are of the type:

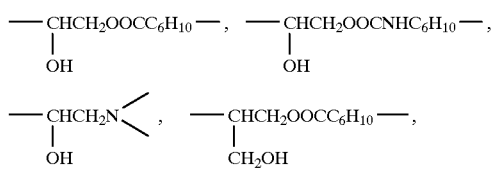

-continued

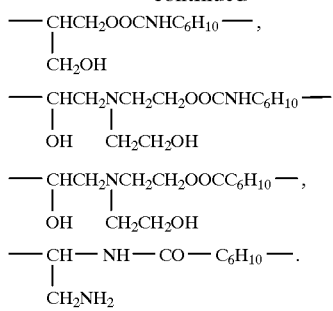

In particular can be mentioned as groups which must be absent from the hydrogenated part $R_H$, for instance, —COOH; —NH—COO—; —NH—CO—NH—; —OH; —NH$_2$; —NH—; CO—NH—.

The radical $R_f$ of molecular weight comprised, preferably, from 500 to 5000, more preferably from 700 to 1500, represents a fluoropolyether chain bifunctional radical, comprising as repetitive units sequences of one or more oxyfluoroalkylene units of the type

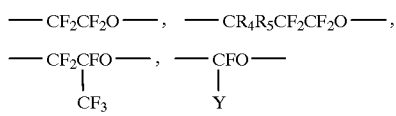

The fluorinated polymers of the present invention by addition of amounts of solvent less than 30% by weight on the formulation, unexpectedly lead to the formation of solutions having an extremely low viscosity, generally of the order of 100–500 cPoise at room temperature. In practice the high dry fluorinated polymers of the former European patent application in the name of the Applicant, modified according to the invention, show a slight increase of the viscosity which is reduced by addition of small amounts of solvent, generally lower than 10% by weight.

The preferred compounds of the formula II are the following:

1) 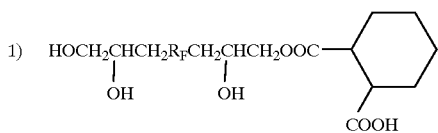

wherein: $R_H =$ —CH$_2$—, x = 1, y = 0

$Rh_1 =$ 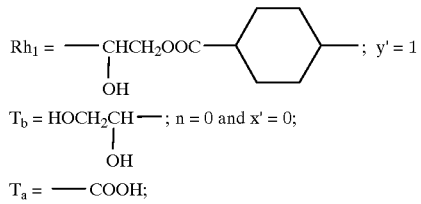 ; y' = 1

$T_b =$ HOCH$_2$CH—  ; n = 0 and x' = 0;
         |
         OH $T_a =$ —COOH;

2) 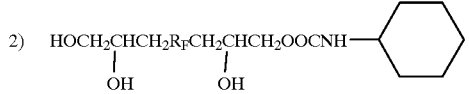

wherein: $R_H =$ —CH$_2$—, x = 1, y = 0

$Rh_1 =$ 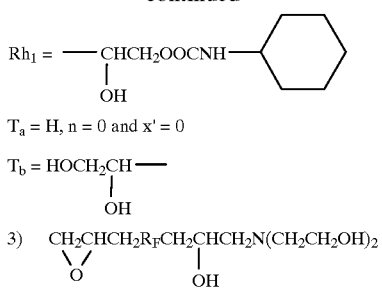

$T_a =$ H, n = 0 and x' = 0

$T_b =$ HOCH$_2$CH—
         |
         OH

3) 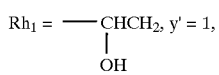

dove: $R_H =$ —CH$_2$—, x = 1

$Rh_1 =$ 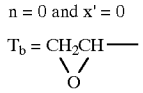

y = 0,
n = 0 and x' = 0

$T_b =$ 

$T_a =$ —N(CH$_2$CH$_2$OH)$_2$

Other preferred structures:

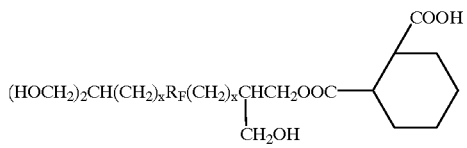

$R_H =$ —CH$_2$—, x integer from 1 to 10, $T_b =$ (HOCH$_2$)$_2$—CH— y = 0 y$_1$ = 1

$Rh_1 =$ 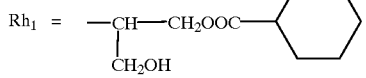

$T_a =$ —COOH;

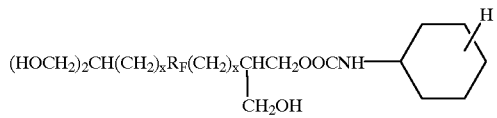

wherein the meaning is equal to the above structure with the difference that:

$Rh_1 =$ 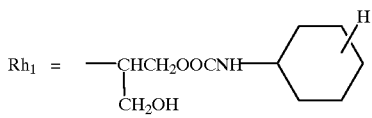

$T_a =$  ;

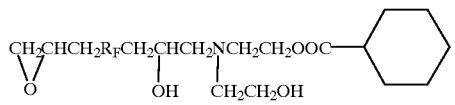

wherein:
$R_H$=—$CH_2$—, x=1;

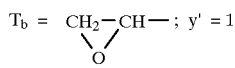

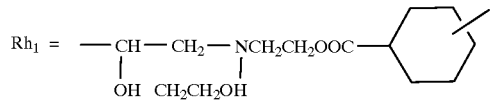

$T_a$ = H—;

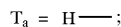

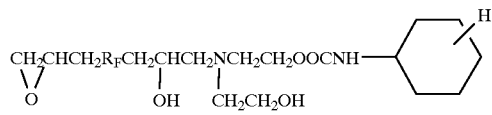

as the above formula wherein

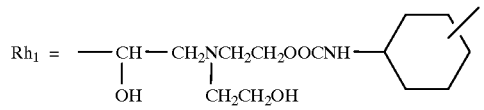

Solvents generally utilizable are those broadly used in the field of paints, they are for instance of the type: ketones, esters, esters of heteroalcohols, alcohols, aromatics. Methylethylketone, methylisobutylketone, ethyl or butyl acetate, cellosolve acetate, propylenglycolmethylether acetate, xylene, halogen compounds containing hydrogen type fluorocarbons HCFC, HFC and having a fluoropolyether structure, are preferred. Chlorofluorocarbons not containing hydrogen are excluded as solvents.

The crosslinking agents used are the commercial ones and however the ones well known for the crosslinking of the crosslinkable functional groups. For instance the polyhydroxylated products of formula (II) are crosslinkable with melaminic resins, with weight ratios comprised between 70:30 and 90:10, preferably 80:20, of the polyhydroxylate compound to melamine; the crosslinking temperature is around 130–150° C.

The films obtained are homogeneous, transparent and hydrolysis resistant.

Alternatively the polyhydroxylated polymers are crosslinkable with polyisocyanates containing isocyanurated rings, or using suitable polyisocyanic prepolymers based on isophorondiisocyanate (IPDI), toluendiisocyanate (TDI), hexamethylendiisocyanate (HDI), etc. in the presence of metal or aminic catalysts, at room temperature or higher, using a NCO/OH ratio for instance from 1/1 to 1.5/1.

Blocked polyisocyanates obtainable from the polyisocyanates indicated above by reaction, for instance, with phenols or ketoxime, can also be used.

Other kinds of crosslinking are of peroxidic type by using conventional organic peroxides, for instance, di-ter-butylperoxide, lauroylperoxide, benzoylperoxide if the resin is crosslinkable by radical way. Other radical initiators not of peroxidic type can also be used, such as for instance AIBN (aza bisisobutyronitrile).

The excellent properties of viscosity, together with the good compatibility with the solvents of current use in the field of paints and with the various crosslinking agents of paints make the fluorinated polymers of the present invention suitable for formulating high dry paints endowed with the good optical and mechanical properties described above, with respect to the coatings obtained from the resins of formula (I) described in a former European application in the name of the Applicant.

Improved gloss, high image definition, high adhesion to the various types of supports, good hardness and elasticity in addition to optimal thermal, chemical and hydrolytic resistances, can be mentioned.

The described properties are obtainable with formulations which are used with very small amounts of solvent, therefore with a remarkable reduction of the environmental impact and consequently of costs for eliminating solvents and recovery thereof.

The fluorinated products of the present invention have a very good crosslinking density and then very good mechanical properties and resistance to swelling.

In particular the fluoropolyethers of $R_f$ type utilizable according to the present invention can be of the following types, indicating the repetitive units of the chain:

a) —$(C_3F_6O)_{m'}(CFYO)_{n'}$— wherein the unit $(C_3F_6O)$ and (CFYO) are perfluorooxyalkylene units statistically distributed along the chain; m' and n' are integers such as to give the molecular weight indicated above, and m'/n' is comprised from 5 to 40, when n' is different from 0; Y is equal to F or $CF_3$; n' can be also 0;

b) —$(C_2F_4O)_{p'}(CFO)_{q'}$—$(C_3F_6O)_{t'}$—
          |
          Y wherein p' and q' are integers such that p'/q' ranges from 5 to 0.3, preferably 2.7–0.5 and such that the molecular weight is the one indicated above; t' being an integer with the meaning of m', Y=F or $CF_3$; t' can be 0 and q'/q'+p'+t' lower or equal to 1/10 and the ratio t'/p' is from 0.2 to 6;

c) —$CR_4R_5CF_2CF_2O$— wherein $R_4$ and $R_5$ are equal to or different from each other and selected from H, Cl, the molecular weight being that indicated above, a fluorine atom of the perfluoromethylene unit can be replaced by H, Cl or perfluoroalkyl, for instance 1–4 C atoms.

The indicated fluoropolyethers ($R_f$) are obtainable with the processes well known in the art, for instance, U.S. Pat. Nos. 3,665,041, 2,242,218, 3,715,378 and European patent EP 239,123. The functionalized fluoropolyethers with Rf chain are obtained for instance according to patents EP 148,482, U.S. Pat. No. 3,810,874, as well as according European patent application 95101145.1.

The fluoropolyethers functionalized of formula II according to the present invention can be mixed each other in various ratios or with the products of formula I and/or with hydrogenated bi- or polyfunctional monomers or resins. Of the latter, polyols are preferred among which butanediol, trimethylolpropane, pentaetithrol, polycaprolactones, polyester of acrylic resins having low molecular weight, the ratio in equivalents between the monomer/hydrogenated resin with the fluorinated polymers of the invention ranges from 0.1 to 5, and with the proviso that the formulation is an homogeneous solution. In this way blends having specific properties depending on the particular type of the desired coating, are obtained.

The ratio between the fluorinated resins of formula II of the invention and those of formula I are for instance in equivalents from 10:1 to 1:10.

The process for preparing the fluorinated polymers of formula II consists in reacting the products of formula I with reactants capable of reacting with at least a functional reactive group of the T terminals of the compound of formula I and with the stoichiometry such as to leave at least one of the reactive groups in the T terminals of formula I.

Particularly suited reactants that can be mentioned belong to the following classes:

anhydrides: aliphatic from 2 to 18 C atoms, for instance butyric anydride; cycloaliphatic from 4 to 12 C atoms, the hexahydrophthalic anhydride is preferred; aromatic from 8 to 12 C atoms, preferably phthalic anhydride;

acylic chlorides: from 2 to 18 C atoms, for instance butyril chloride;

isocyanates: aliphatic from 4 to 12 C atoms, preferably butyl isocyanate; cycloaliphatic from 7 to 12 C atoms, preferably cyclohexyl isocyanate; aromatic from 7 to 12 C atoms, preferably phenyl isocyanate;

haloidrines from 3 to 12 C atoms, preferably epichloridrine; secondary amines $NHR_1R_2$, wherein $R_1$ and $R_2$ contain alcoholic functions, $R_1$ and $R_2$, equal to or different from each other, are aliphatic from 2 to 12 C atoms, preferably diethanol amine;

amino silanes $NH_2$—R—$Si(OR_i)_3$ with R and $R_i$, equal to or different from each other, aliphatic from 1 to 10 C atoms, preferably γ-aminopropyltrimethoxysilane.

The process for preparing the fluorinated polymers based on fluoropolyethers of formula I comprises: etherification of fluoropolyether having hydroxilic ends by salification of fluoropolyether, and nucleophilic reaction with alkylic or arylic dihalides or pseudohalides, obtaining a fluorinated polymer A') of formula corresponding to (I) wherein T' is replaced by X), wherein the terminal X is susceptible of further nucleophilic attack; subsequent functionalization by nucleophilic attack of A') with compounds containing carboanions to obtain the compound of formula corresponding to (I) containing the T terminal, then optionally transformation of the functional T groups crosslinkable by reaction of reduction or extension of chains with polyols, or ammonolysis or hydrolysis depending on the terminal of the compound (I).

The fluoropolyethers having hydroxylic terminals, for instance of $Z^2$, $P^2$ and $A^2$ type are obtainable according to known processes.

($A^2$) $HO(CH_2CH_2O)_nCH_2CF_2O(CF_2CF_2O)_p(CF_2O)_qCF_2CH_2(OCH_2CH_2)_nOH$, wherein for instance p/q=1, and n=1.8 and having a number average molecular weight $\overline{M}n$ 1250 and functionality 1.95;

($Z^2$) $HOCH_2CF_2O(CF_2CF_2O)_p(CF_2O)_qCF_2CH_2OH$ having for instance p/q=0.77, $\overline{M}n$ 1000 and functionality 1.96;

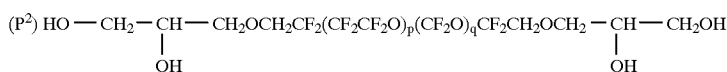

(see just as an indication Example 1).
For instance, $Z^2$ is obtainable by reduction of the corresponding diester according to U.S. Pat. No. 3,810,874; $A^2$ by salification of $Z^2$ and reaction with ethylene oxide. Similarly one can obtain the compounds with fluorooxyalkylene units specified above for all the products $Z^2$, $P^2$ and $A^2$ type.

In particular the process comprises:
1° step) Consists in a direct etherification of the fluoropolyether with hydroxylic terminals, according to a pattern of nucleophilic substitution, Williamson type. In practice, the fluoropolyether (PFPE) with hydroxylic terminals is dissolved in a solution of potassium or sodium alcoholate in the corresponding alcohol, obtaining the alcoholate of the fluoropolyether. This is slowly added to t-butanol, or other solvent (for instance dioxane), containing a large excess of alkylic or arylic dihalide or pseudohalide.

Typically in this phase 1,4-dibromobutane, 1,5-dibromopentane, 1,6-dibromohexane, 1,8-dibromooctane, 1,10-dibromodecane and other higher or lower homologous compounds with bromides or chlorides terminals, can be used as reactants. 1,4-Cyclohexanedimethanol dimesylate or ditosylate, mixtures of α,α' dibromo or dichloro xylene or their pure isomers can also be used.

The reaction temperature, depending on the halide reactivity, is comprised from +30 to +90° C. and the reaction time is 1–8 hours.

The fluoropolyethers, alkylated with conversion near 100%, are isolated by precipitation in $H_2O$ and filtration or distillation of by-products and reactants in excess. The residue or the filtrate corresponds to the general formula ($A^1$) which is the same as (I) wherein the terminal is X (instead of T). X is still a reactive replaceable terminal being of the —Br, —Cl, —$OSO_2CH_3$, (called herein —$OM_s$),

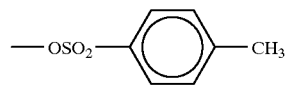

type, (called herein —$OT_s$), etc.

2° step) Functionalization. By using active methylene compounds, such as for instance ethyl or methyl malonate or ethyl or methyl 1,1,2 ethanetricarboxylate when a higher final functionality is desired, or still polyols partially protected such as formal alycerol.

The reaction of the PFPE adduct of formula $A^1$, obtained in step 1, with active methylene compounds occurs easily and with high yields. The adduct ($A^1$) is added slowly to an alcoholic solution for instance of sodic or potassic malonate, at a temperature of 40–80° C. heating for 2–8 hours. A product of formula (I) (adduct I) is obtained wherein the terminal T contains COOR (R being for instance the residue of the malonate). This product is isolated, with practically quantitative yields, by extraction with $H_2O$ and distillation of the solvents and reactants in excess.

Optionally from the adduct I it can be obtained the release of other reactive functions, typically by reduction of the carboxylic esters for instance with $LiAlH_4$/THF or by hydrogenation, or still by extension of the carboxyls with sterically hindered dialcohols (for instance neopentylglycol), by ammonolysis and reduction to give polyamine or simply by hydrolysis to give polyacids.

The adducts of type (I) obtained by polyfunctionalization with partially protected polyols, can lead to PFPE polyols for instance by releasing the acetal by hot treatment with mineral acids.

The partially fluorinated resins so obtained having alcoholic, aminic, acid functionality, etc. can be easily titrated for determining equivalent weight and functionality, for instance with the phenylisocyanate method or with alcoholic HCl or alcoholic KOH.

The final functionality of the resin of formula (I) so obtained is in any case 2 or higher, for instance 4 and 6.

From the products of the formula I thus obtained, as already said, the products of the invention of formula II are obtained by means of a partial transformation of the reactive functional groups of the T terminals to obtain $T_a$ and $T_b$ as defined above.

For instance if T contains —OH reactive groups it is possible to carry out the reaction by condenstion with anhydrides, acids, esters, acylic chlorides.

Depending on the stoichiometric ratio used between the compounds of formula I and the selected reactant, the resins of formula II in admixture with the resins of formula I or mixtures of products of formula II can be directly obtained. If the product of formula II is desired pure, this can be obtained directly by synthesis with the reactant, or by chemical/physical separation, for instance distillation or column chromatography, or frationated precipitation.

If the T groups contain reactive groups of epoxy type, it is possible to obtain $T_a$ and $T_b$ for instance by reaction with nucleophils, such as for instance primary or secondary amines, carboxylic acids in the presence of basic catalysts.

In Table 1 some products of formula II are reported for illustrative and not limitative purposes, starting from the resins of formula I to give $T_a$ and $T_b$.

| FLUORINATED RESIN | REACTANT | PRODUCT |
|---|---|---|
| Z DOL ($A^2$) |  |  (XI) |
| Z DOL ($A^2$) | $X-CH_2-CH-CH_2$ (epoxide) | $H-R_F-CH-CH_y$ (epoxide) |
| (XI) | $HN(CH_2CH_2OH)_2$ |  (XII) |
| (XII) |  |  |
| (XII) |  |  |

-continued

| FLUORINATED RESIN | REACTANT | PRODUCT |
|---|---|---|
| Z TETRAOL (P$^2$) | cyclohexane with two adjacent CO-O-CO (anhydride) | HO—CH$_2$—CH(OH)—CH$_2$—R$_F$—CH$_2$—CH(OH)—CH$_2$OOC—(cyclohexyl)—COOH |
| Z TETRAOL (P$^2$) | cyclohexyl-NCO | HO—CH$_2$—CH(OH)—CH$_2$R$_F$—CH$_2$—CH(OH)—CH$_2$OOC—N(H)—(cyclohexyl) |
| Z EPOX (VI) | HN(CH$_2$CH$_2$OH)$_2$ | CH$_2$(epoxide)—CH—CH$_2$—R$_F$—CH(OH)—CH$_2$—N(CH$_2$CH$_2$OH)$_2$ |
| (VII) | cyclohexyl-NCO | CH$_2$(epoxide)—CH—CH$_2$—R$_F$—CH(OH)—CH$_2$—N(CH$_2$CH$_2$OOCN(H)(cyclohexyl))(CH$_2$CH$_2$OH) |
| Z EPOX (VI) | H$_2$N(CH$_2$)$_4$—Si(OCH$_3$)$_3$ | (OCH$_3$)$_3$—Si—(CH$_2$)$_4$—NH—CH$_2$—CH(OH)—CH$_2$—R$_F$—CH$_2$—CH(OH)—CH$_2$NH(CH$_2$)$_4$SiOCH$_3$)$_3$ |
| Z TETRAOL (P$^2$) | CH$_2$=C(CH$_3$)—CO—NCO | CH$_2$=C(CH$_3$)—CO—NH—CO—OCH$_2$—CH(OH)—CH$_2$R$_F$—CH$_2$—CH(OH)—CH$_2$—O—CO—NH—CO—C(CH$_3$)=CH$_2$ |
| Z TETRAOL (P$^2$) | cyclohexyl-COCl | HOCH$_2$—CH(OH)—CH$_2$—R$_F$—CH$_2$—CH(OH)—CH$_2$OOC—(cyclohexyl) |

EXAMPLE 1

100 g of a fluoropolyether of formula $HO(CH_2CH_2O)_n$ $CH_2CF_2O(CF_2CF_2O)_p(CF_2O)_qCF_2CH_2$ $(OCH_2CH_2)_nOH$ $(A^2)$ (ZDOL) having p/q=0.84, n=0, $\overline{M}n$ 950 (number average molecular weight) and functionality 1.93, are loaded in a 4 necks glass flask, equipped with dropping funnel, thermometer, refrigerant and mechanical stirrer, the internal temperature is brought to 70° C.

1.14 g of potassium terbutylate are added under nitrogen, obtaining a solution.

After 15 minutes 15.82 g of glycidol

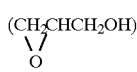

are dropped during 4 hours and the reaction mixture is kept at 70° C. for further 4 hours.

It is cooled and acidified with aqueous HCl, the salts are removed by filtration, and water is eliminated by distillation at 100° C. under vacuum.

102 g of a product are obtained which from the analysis results to be:

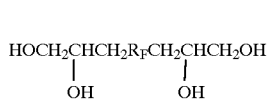

In accordance with the structure reported above the equivalent hydroxylic weight, determined by NMR $^{19}F$ analysis results to be 280. The viscosity results to be at 20° C. of 2500 cPs.

EXAMPLE 2

100 g of the product of formula ($P^2$) are loaded with 13.8 g of hexahydrophthalic anhydride in a 3 necks reactor equipped with thermometer, mechanical stirrer and refrigerant. The reaction mass is brought to 120° C. under nitrogen keeping it under stirring for 4 hours, following by I.R. the anhydride disapperance.

It is cooled then at room temperature by recovering 110 g of a product which at the analysis (NMR $^1H$, $^{19}F$, IR) results to be a mixture containing the product of formula ($P^2$) with

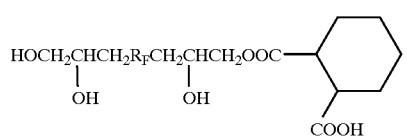

and

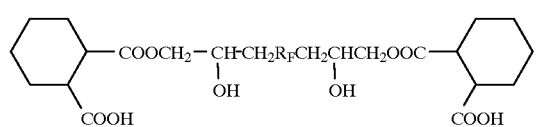

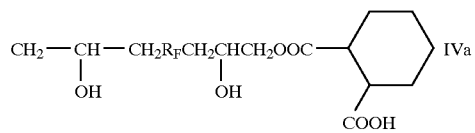

The hydroxylic equivalent weight, in accordance with the reaction stoichiometry, results to be 340, the viscosity at 20° C. is 5700 cPs.

The separation of the mixture of the products $P^2$, IV and IVa was carried out by column chromatography.

EXAMPLE 3

100 g of the fluorinated polyol of formula ($P^2$) are loaded in a 4 necks flask equipped with dropping funnel, refrigerant with nitrogen valve, mechanical stirrer and thermometer. 40 ml of anhydrous butyl acetate containing dibutyltindilaurate (DBTDL) (1% moles/NCO) are then added under nitrogen, the solution is heated to 80° C., then 11.2 g of cyclohexylisocyanate are slowly dropped. The reaction mass is kept at 80° C. until the NCO I.R. signal disappears. The solvent is then removed by distillation and 108 g of a product are obtained, formed by: the product of formula $P^2$) with a product of formula (V):

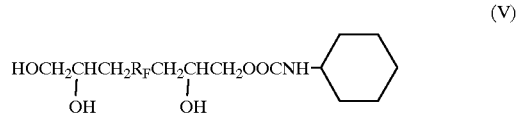

and the bis-adduct Va of formula

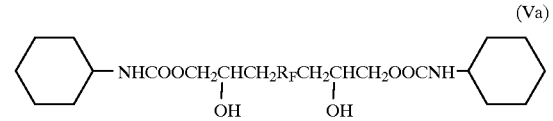

having an hydroxylic equivalent weight of 415 and a viscosity of 4700 cPs at 20° C.

EXAMPLE 4 and EXAMPLE 4A (Comparative)

The fluorinated polyol of formula ($P^2$) of example 1 (Example 4A) and the mixture of products of example 2 (Example 4) are separately formulated with a commercial melaminic (Cymel$^{(R)}$ 325).

EXAMPLE 4A

The polyol of formula ($P^2$) can be mixed with no more than 10% p/p of Cymel 325, then hazes and opalescences appear in the formulation, not even removable by dilution with conventional solvents such as butanol or cellosolve. It is threfore not possible to obtain a sufficiently crosslinked film and therefore of good quality, considering the reduced amount of melamine added up to homogeneous conditions.

EXAMPLE 4

The mixture of Example 2 ($P^2$+IV+IVa) can be mixed, without limitations with Cymel$^{(R)}$ 325 always obtaining limpid solutions. In particular the following formulation was prepared:

| | | |
|---|---|---|
| Mixture Example 2 | 80 g | |
| Cymel ® 325 | 30 g | |
| n-butanol | 10 g | |
| p-toluenesulphonic acid | 0.1 g | |

The formulation is applied on a aluminium plate and crosslinked at 140° C. for 30 minutes, obtaining a crosslinked transparent film having the following charateristics:

| | |
|---|---|
| Hardness (Buchholtz) (ISO 2815 (1973)) | 91 |
| Gloss (60°) (ASTM D523) | 80 |
| Folding (spindle) (mm) (ASTM 522) | <3, 17 mm |
| MEK test (AICC 23) | 100 double strokes |
| Haze (ASTM D1003) | absent |
| adhesion (cross cut) (%) (ASTM 3359) | 100% |

The film was submitted to abrasion resistance test (MAR resistance) according to ASTM D673 standard giving a gloss variation at 60° C. lower than 10%.

The film shows moreover an high resistance to solvents, as indicated by the spot-test with xylene and methylethyl ketone (1 hour at 30° C.) which does not cause any variation in the aesthetic and mechanical characteristics of the film itself.

EXAMPLE 5 and EXAMPLE 5A (Comparative)

The mixture of fluorinated resins obtained in Example 3 ($P^2$, V and Va) is formulated with a polyisocyanic crosslinking agent, (adduct of trimethylpropane with isoforondiisocyanate—Polurene MC, Sapici) according to these ratios:

| | | |
|---|---|---|
| Mixture Example 3 | 30 g | |
| Polurene MC | 28.3 g | |
| DBTL | 1.7 g | (5% solution in propylenglicol methylether acetate (PMA)) |
| Butyl acetate | 3 g | |

The formulation appears limpid and homogeneous and is applied on an aluminium sublayer and crosslinked at 50° C. for 1 hour. The characteristics (measured according to the above mentioned standards) of the polymeric film thus obtained are the following:

| | |
|---|---|
| Hardness (Buchholtz) | 77 |
| Gloss (60°) | 78 |
| Folding (spindle) | <3, 17 mm |
| Adhesion (cross cut) | 100% |

EXAMPLE 5A (Comparative)

The same formulation of Example 5 obtained by using the polyol of formula ($P^2$) require instead a stay time of 10 minutes to become compatible. This causes an undesired increase of the viscosity of the formulation with a consequent reduction of the times useful for the film application. Moreover the obtained film shows a poor homogeneity and a consequent low gloss (<10).

EXAMPLE 6

100 g of fluoropolyether diol of formula $A^2$ (of Example 1) are added to a solution containing 23.95 g of potassium terbutylate in 150 ml of terbutanol under nitrogen.

The solution obtained is then added in 4 hours, by means of dropping funnel, to an epibromidrine solution (100 g) dissolved in 20 ml of terbutanol at 70° C. When the pH of the solution becomes neutral it is cooled, the salt is removed by filtration and the reaction solvent is distilled, then the excess of epibromidrine is removed under vacuum at 80° C.

In this way 102 g of a product of formula (VI):

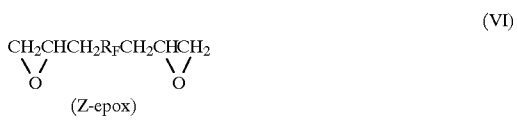

(Z-epox)

are recovered, which contains oligomeric products in amounts lower than 5% by weight; the epoxy equivalent weight is 550 and the viscosity is of 120 cPs at 20° C.

The fluorinated resin of formula (VI) is formulated with the polyamine, for intance DETA (diethylentriamine)

and crosslinked.

A transparent film having a good adhesion and hardness is obtained.

100 g of the product of formula (VI) are mixed to 30 ml of anhydrous isopropanol and to 10.1 g of diethanolamine previously anydrified under vacuum at 90° C. for 2 hours.

Such a mixture is heated to 80° C. for 6 hours in a 3 necks reactor equipped with thermometer, refrigerant and mechanical stirrer.

The reaction product results to be formed by the starting product (VI) (22%), by the mono adduct of the amine (VII) (56%) and by the bisadduct (VIII) (22%), by column chromatographic separation the two additional products of formula

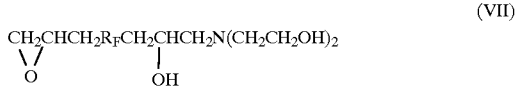

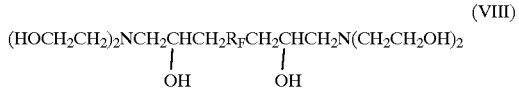

are isolated.

The product (VII) has an epoxy equivalent weight of 1150, an hydroxylic equivalent weight of 350 and a viscosity of 1100 cPs at 20° C.

The product of formula (VIII) has an hydroxylic equivalent weight of 285 and a viscosity of 8000 cPs at 25° C.

EXAMPLE 7

The fluorinated polyol of formula ($P^2$) shows a limited compatibility with other polyether or polyester chain hydrogenated polyols.

On the contrary the fluorinated polyol of formula (IV) shows higher characteristics of compatibility with other hydrogenated polyol resins. For instance it is possible to prepare a 50% solution w/w of (IV) with polycaprolactone triol (Mn 300, PCL 300) without solvent.

For instance it was possible to prepare the homogeneous formulation having the following composition:

| | |
|---|---|
| Polyol (P²) | 40 g |
| Polyol (IV) | 20 g |
| PCL 300 | 20 g |
| Cymel ® 325 | 54 g |
| n-butanol | 15 g |
| p-toluenesulphonic acid | 0.1 g |

The limpid formulation is applied on an aluminium sublayer and crosslinked at 140° C. for 30 minutes. A film of high mechanical properties, chemical reistance and optimal aspect (Gloss 87) is obtained.

EXAMPLE 8

100 g of polyol (P²) are loaded in a 3 necks flask equipped with dropping funnel, refrigerant and mechanical stirrer.

30 ml of anydrous butyl acetate are added, it is heated at 100° C. by adding 3 drops of 5% DBTDL in butyl acetate and 21.8 g of isocyanatepropyltriethoxysilane (Y-9030, Union Carbide) are slowly added.

The disappearance of the NCO absorption is monitored by I.R., then the solvent is evaporated recovering 194 g of a mixture consisting of the polyol (P²) , (IX) and (X):

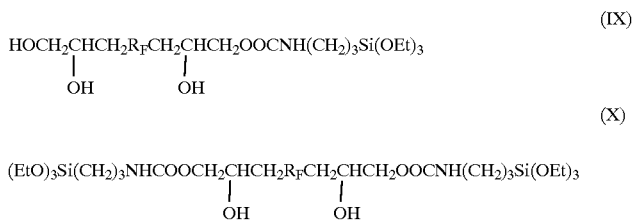

(IX)

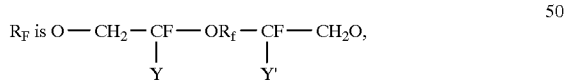

(X)

The reaction mixture thus obtained is formulated with Cymel$^{(R)}$ 325 and applied on the glass, giving a film having very good aesthetic properties, high abrasion resistance and high adhesion.

We claim:

1. Fluoropolymers based on fluoropolyethers for the preparation of crosslinkable high dry formulations, pure or in admixture with each other, having the formula:

$$T''-(R_{h2})_y(R_H)_x-R_F-(R_H)_x-(R_{h1})_y T'_a$$

wherein

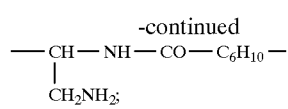

wherein $R_f$ is a fluoropolyether chain of number average molecular weight between 500 to 5000; wherein Y and Y' are equal to or different from each other and being F or $CF_3$; x is an integer from 0 to 10; $R_H$ is selected from the group consisting of a linking bivalent radical of a linear aliphatic $-(CH_2)_m-$, wherein m is an integer from 1 to 20, $(OCH_2CH_2)_{m'}$ wherein m' is an integer from 1 to 6, (alkylene)-cycloaliphatic, (alkylene)aromatic, and mixtures thereof, wherein the (alkylene)-cycloaliphatic, and (alkylene) aromatic optionally have heteroatoms in the ring or in the chain, the number of carbon atoms of the cycloaliphatic moieties being from 3 to 20, for the aromatic moieties from 5 to 30; $R_F$ and $R_H$ do not contain groups capable of linking by means of hydrogen bonds to basic acceptors; $R_{h1}$ and $R_{h2}$, are equal to or different from each other, are linking bivalent radicals, contain at least a functional group capable of linking by means of hydrogen bonds with basic acceptors and are selected from the group consisting of

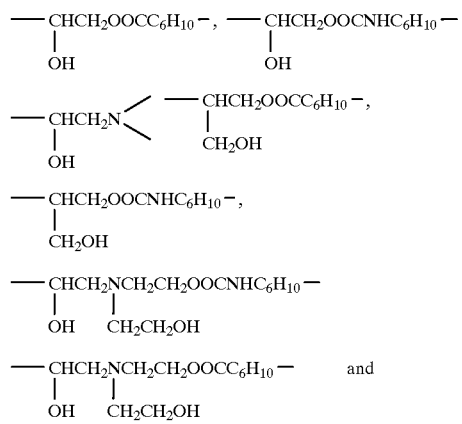

-continued $$-CH-NH-CO-C_6H_{10}-$$
$$|$$
$$CH_2NH_2;$$

y and y' are equal to or different from each other, are integers from 0 to 1, at least one of y and y' being different from 0;

$T_a$ equals $-(CH_2CH_2O)_n-(R_H)_x-T_a$ wherein n is an integer from 0 to 6;

$T''$ equals $(CH_2CH_2O)_n-(R_H)_x-T_b$;

x' is an integer from 0 to 10, x' is the same or different than x; and $T_a$ and $T_b$ being hydrogen or a reactive terminal capable of rendering the fluoropolymers at least bi-functional and reactive towards ionic and radical crosslinking agents and $T_a$ being equal to or different from $T_b$ such that $T_a$ and $T_b$ end groups are not contemporaneously H.

2. Fluoropolymers according to claim 1, wherein the $T_a$ and $T_b$ terminals are of the type:

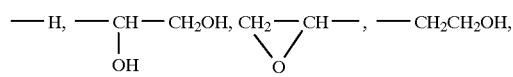

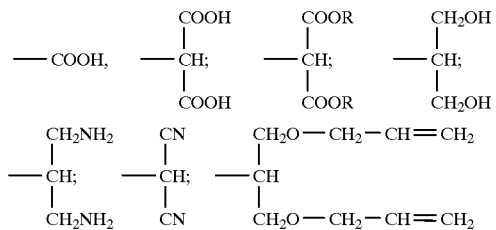

3. Fluoropolymers according to claim 1, wherein the radical $R_f$ of number average molecular weight comprised from 700 to 1500, represents a fluoropolyethereal chain bifunctional radical, comprising as repetitive units sequences of one or more oxyfluoroalkylene units

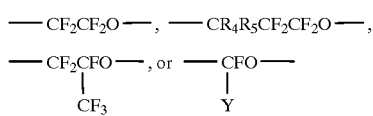

wherein $R_4$ and $R_5$ equal to or different from each other are H or Cl.

4. Fluoropolymers according to claim 1 selected from the group consisting of following:

1)
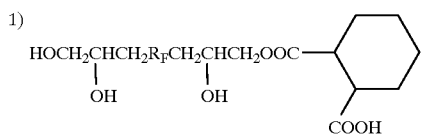

2)
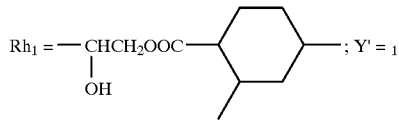

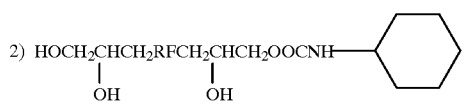

3)
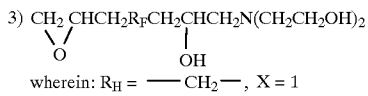

wherein: $R_H = $ —$CH_2$—, X = 1

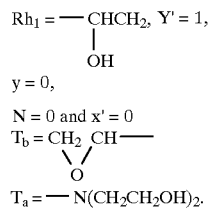

$y = 0$, $N = 0$ and $x' = 0$ $T_b = CH_2\ CH$—
\\ /
O $T_a = $ —$N(CH_2CH_2OH)_2$.

5. Fluoropolymers according to claim 1 wherein $R_f$ is selected from the group consisting of a) —$(C_3F_6O)_{m'}(CFYO)_{n'}$— wherein the unit $(C_3F_6O)$ and $(CFYO)$ are perfluorooxyalkylene units statistically distributed along the chain; m' and n' are integers such as to give the molecular weight of from 700 to 1500, m'/n' is 5 to 40 when n' is different from 0; Y is equal to F or $CF_3$;

b) —$(C_2F_4O)_{p'}(CFO)_{q'}(C_3F_6)_{r'}$— wherein p' and q' are integers such that p'/q' ranges from 5 to 0.3 and such that the molecular weight is that indicated in a); t' being an integer with the meaning of m', Y=F of $CF_3$; and q'/(q'+p'+t') is less than or equal to 1/10 and the ratio t'/p' is from 0.2 to 6; and c) —$CR_4R_5CF_2CFO$ wherein $R_4$ and $R_5$ are equal to or different from each other and are H, or Cl, the molecular weight being that indicated in a), and a fluorine atom of the perfluoromethylene unit is optionally replaced by a member selected from the group consisting of H, Cl, and perfluoroalkyl.

6. Cross linkable dry formulations for top coatings having a thickness less than 50μ said formulations containing fluoropolymers based on fluoropolyethers of claim 1, one or more solvents in amounts less than 30% by weight, the percentage by weight of solvent being based on the ratio between the solvent weight and the formulation weight, said solvents being selected from the group consisting of ketones, esters, esters of heteroalcohols, aromatics, hydrochlorofluorocarbons, hydrofluorocarbons and compounds having a fluoropolyether structure.

7. Coatings and films obtainable from the formulations of claim 6 by crosslinking of the polymers and hydrogen-containing bi- or polyfunctional monomers or polyols selected from the group consisting of butanediol, trimethylolpropane, pentaerythrol, polycaprolactones, and polyesters of acrylic resins having low molecular weight, with the proviso that the formulation is a homogenous solution and evaporating the solvent.

* * * * *